(12) United States Patent
Lewison et al.

(10) Patent No.: US 8,558,099 B2
(45) Date of Patent: Oct. 15, 2013

(54) MUSICAL AID

(75) Inventors: Martin Lewison, Christchurch (GB); Jolanda Seabourne, Christchurch (GB)

(73) Assignee: Pianowand Limited, Dorset (GB)

( * ) Notice: Subject to any disclaimer, the term of this patent is extended or adjusted under 35 U.S.C. 154(b) by 0 days.

(21) Appl. No.: 13/521,346

(22) PCT Filed: Dec. 30, 2010

(86) PCT No.: PCT/GB2010/052217
§ 371 (c)(1),
(2), (4) Date: Jul. 10, 2012

(87) PCT Pub. No.: WO2011/086342
PCT Pub. Date: Jul. 21, 2011

(65) Prior Publication Data
US 2012/0297957 A1    Nov. 29, 2012

(30) Foreign Application Priority Data

Jan. 13, 2010  (GB) .................................. 1000564.3

(51) Int. Cl.
*G10D 7/12* (2006.01)
(52) U.S. Cl.
USPC .......................................................... 84/478
(58) Field of Classification Search
USPC ...... 84/470 R, 471 R, 472–475, 471 SR, 476, 84/477 R, 478, 479 R, 480–482, 479 A, 84/483.1, 483.2, 484, 485 R, 485 SR
See application file for complete search history.

(56) References Cited

U.S. PATENT DOCUMENTS 2,517,026 A    8/1950  Quednau
3,350,973 A    11/1967 Weis et al.
(Continued)

FOREIGN PATENT DOCUMENTS

CH       501 978      1/1971
FR       2 699 315    6/1994
(Continued)

OTHER PUBLICATIONS

International Preliminary Report on Patentability mailed Jul. 26, 2012 in PCT/GB2010/052217.
(Continued)

*Primary Examiner* — Kimberly Lockett
(74) *Attorney, Agent, or Firm* — Nixon & Vanderhye P.C.

(57) ABSTRACT

A musical aid (2) has an elongate body (4) having at least three ridges (8) which extend outwards and along the musical aid (2). Each ridge (8) has two side surfaces (12) and at least two different side surfaces (12) carry respective sets of key-indicating markers (16) which each represent a different group of types of musical pattern. The musical aid (2) has multiple orientations in which it can be placed on a musical keyboard (40), and in each orientation the key-indicating markers (16) of a different side surface (12) indicate keys for playing a different group of one or more musical patterns. The ridge structure of the musical aid (2) enables many different musical patterns to be represented in a compact form on the different side surfaces (12) of the ridges (8). When in use, the shape of the ridge structure anchors the musical aid (2) to the keyboard (40) and causes the side surfaces (12) to be placed a convenient angle for the keyboard player to see the markers (16).

20 Claims, 9 Drawing Sheets

(56) References Cited

U.S. PATENT DOCUMENTS 6,204,441 B1 * 3/2001 Asahi et al. ................. 84/470 R
6,969,793 B2 * 11/2005 Kerkhoff ......................... 84/478

FOREIGN PATENT DOCUMENTS

| GB | 03556 | 0/1907 |
| GB | 23225 | 0/1914 |
| GB | 1 435 227 | 5/1976 |

OTHER PUBLICATIONS

International Search Report for PCT/GB2010/052217, mailed Mar. 28, 2011.

UK Search Report for GB Application No. 1000564.3, dated May 11, 2010.

* cited by examiner

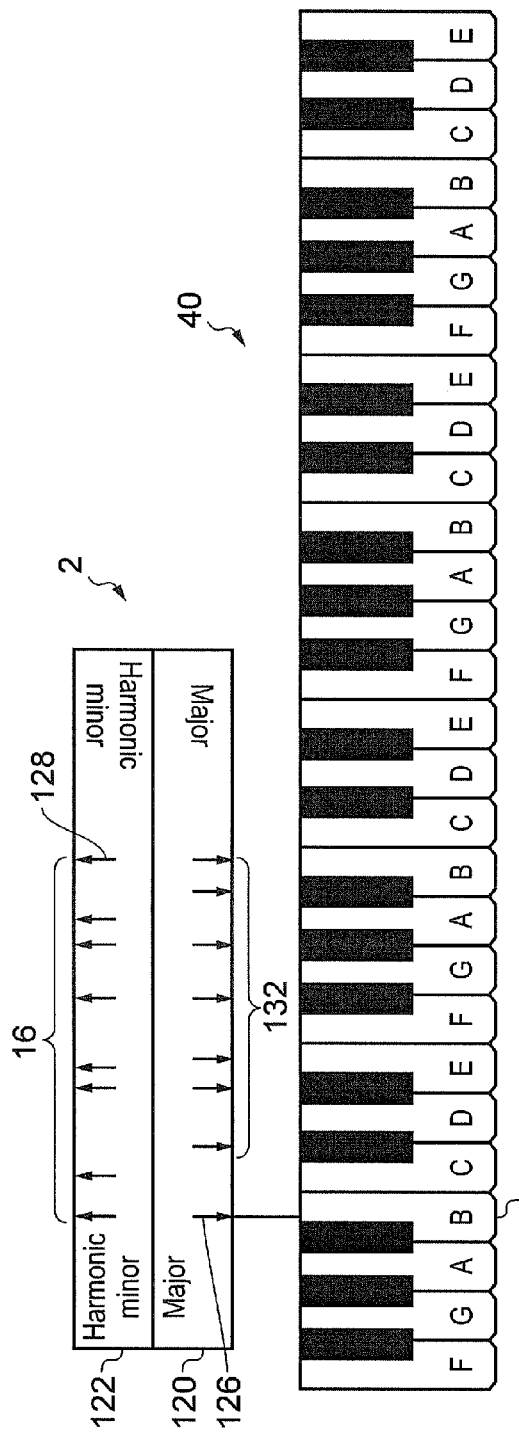
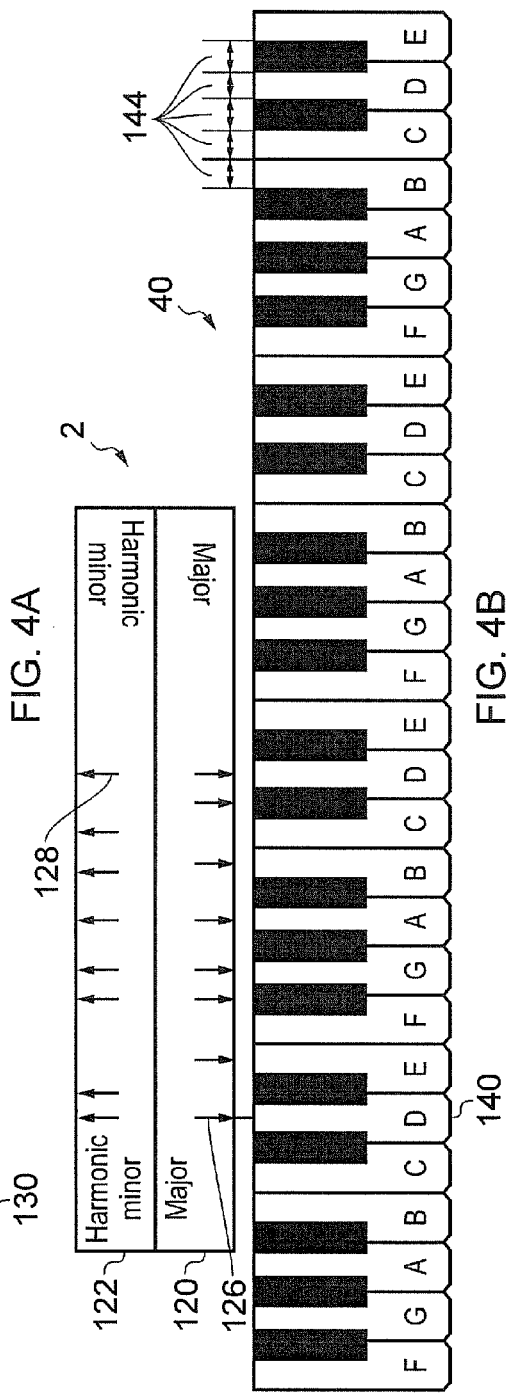
FIG. 4A
FIG. 4B

MUSICAL AID

This application is the U.S. national phase of International Application No. PCT/GB2010/052217, filed 30 Dec. 2010, which designated the U.S. and claims priority to GB Application No. 1000564.3, filed 13 Jan. 2010, the entire contents of each of which are hereby incorporated by reference.

FIELD OF THE INVENTION

The present invention relates to the field of musical aids for use with a musical keyboard.

BACKGROUND OF THE INVENTION

Chord notation is a form of musical notation which is especially useful for notating jazz or popular music. Rather than indicating all the notes to be played, in chord notation only the melody is indicated precisely. The accompaniment is indicated as a series of chord labels indicating what type of chord is to be played at different points of the melody. Chord notation allows the same sheet music to be played on multiple different instruments, since the player of each instrument can interpret the chord in a way suitable for the player's own instrument. Chord notation can also be simpler to read than a fully scored notation, since fewer notes need to be read at once. Another advantage of chord notation is that the chord progressions provide a basis for jazz improvisation.

To read chord notation, the player needs to know how to play the types of chords indicated on the music. As there are twelve possible root notes for chords, and hundreds of different types of chords (especially in jazz music, where unusual chords are sometimes used), there are thousands of possible chords. For a keyboard player, chord books are available which list many diagrams of the keyboard, each diagram having certain keys highlighted to indicate the notes that make up a particular chord. Unfortunately, it is inconvenient to browse through the book trying to find the particular chord desired to play a particular part of a musical piece (especially when the piece of music requires, say, ten or twenty different types of chords). Once the desired chord is found, the player then needs to keep looking backwards and forwards between the book and the keys of the keyboard to work out which notes should be played for the desired chord. Moreover, as each chord is indicated separately in the chord book, the relationship between different types of chords, or different chords of a single type, may not be apparent to the user of the chord book.

Similarly, for other musical patterns such as scales or arpeggios, books are available indicating how to play these musical patterns. However, often scale and arpeggio books indicate these musical patterns using full musical notation, so a player who cannot read musical notation is unable to play the scales and arpeggios indicated.

U.S. Pat. No. 3,350,973 describes a music chord finder device for a keyboard. The device comprises a plate which can be placed next to the keys of the keyboard. The outer surface of the plate carries various markers which are spaced apart to indicate the keys of the keyboard required for playing certain chord types. By sliding the plate up and down the keyboard, different chords can be indicated by the markers. However, the music chord finder device can be awkward to use because the markers are provided in multiple rows one above the other on the surface of the plate, and so it is not always clear which markers correspond to which chords. Also, there is only room for a limited number of types of chords on the outer surface of the plate.

The present technique seeks to address these problems and provide a device for indicating many different musical patterns in a compact form, in a way that is easy to understand for the user.

SUMMARY OF THE INVENTION

Viewed from one aspect, the present invention provides a musical aid for use with a musical keyboard, comprising:
an elongate body having at least three ridges extending outwardly from and linearly along the musical aid, each ridge having two side surfaces, at least two different side surfaces of the at least three ridges carrying respective sets of key-indicating markers, each set of key-indicating markers representing a different group of one or more types of musical pattern; wherein
the key-indicating markers of each set are spaced such that when the musical aid is located on the keyboard in an orientation in which a selected side surface is at a position at which a root key-indicating marker of the set carried by the selected side surface is positioned above any key of the keyboard, the key beneath the root key-indicating marker forms the root note of a group of one or more musical patterns of the types represented by the set carried by the selected side surface, and the remaining key-indicating markers of the set carried by the selected side surface are positioned above keys of the keyboard that correspond to the remaining notes of the group of musical patterns.

A musical aid having this structure allows many types of musical pattern to be represented in a relatively small space, is quick and intuitive to use, anchors the musical aid to the keyboard, and presents the key-indicating markers at a convenient angle for viewing by the keyboard player. These advantages will be explained in more detail below.

The present technique provides a musical aid for use with a musical keyboard (which may be the keyboard of any keyboard-based instrument, for example a piano, electric keyboard, organ, harpsichord, or accordion). The musical aid has an elongate body having at least three ridges which extend outwards from the musical aid. The various ridges each have two side surfaces for accommodating different sets of key-indicating markers representing different groups of musical pattern types. At least two of the side surfaces (whether two side surfaces of the same ridge or respective side surfaces of different ridges) carry markers, although if more side surfaces carry markers then more types of musical patterns can be indicated by the musical aid. This physical structure of the musical aid is advantageous because many surfaces are provided for accommodating key-indicating markers, and thus many musical pattern types can be indicated in a relatively small space.

By locating the musical aid relative to the keyboard in different orientations, different side surfaces are placed next to the keys and so different sets of key-indicating markers are presented to the keyboard player. The player can rotate and orient the musical aid as required in order to select a particular side surface and set of key-indicating markers. The spacing between the key-indicating markers of a given set determines which group of types of musical patterns are indicated by that set. Since there are at least six side surfaces and a single set of key-indicating markers provided on a side surfaces can indicate multiple types of musical pattern, many different types of musical patterns can be indicated in a compact form on the musical aid.

Each set of key-indicating markers includes a root key-indicating marker. The key-indicating markers of a set are spaced apart so that when the root key-indicating marker is aligned with any key of the keyboard, the remaining key-indicating markers indicate keys corresponding to remaining notes in a group of one or more musical patterns that use the note corresponding to the selected key as a root note. The present technique recognises that, although at the part of the keyboard that is closest to the keyboard player (the front part of the keyboard) the white and black keys have different widths, towards the back of the keyboard the width of the keys is substantially uniform across the length of the keyboard. Therefore, a single set of key-indicating markers can represent a group of one or more types of musical pattern which can be applied to any given root note by shifting the musical aid up or down the length of the keyboard. The present technique thus avoids using different sets of key-indicating markers for indicating musical patterns of the same type but with different root notes (unlike the chord or scale book, which lists separate diagrams or music staves for the chords or scales with each different root note). The musical aid can therefore be made more compact than the chord or scale book, and is quicker to use than the chord or scale book, especially if more than one musical pattern of the same type is to be played.

In the present application, the term "musical pattern" is used to mean a specific chord, scale or arpeggio having a particular root note (e.g. Bb suspended fourth chord, F melodic minor scale, or C major arpeggio), while the term "type of musical pattern" is used to mean a general chord type, scale type, or arpeggio type (e.g. suspended fourth chord, melodic minor scale, or major arpeggio). Thus, when the musical aid is not located on the keyboard, each set of key-indicating markers indicates a respective group of one or more types of musical pattern, since the key-indicating markers are not linked to any specific notes of the keyboard. When the musical aid is located on the keyboard in a particular orientation, the key-indicating markers of a selected side surface are aligned with specific keys of the keyboard and so then the key-indicating markers indicate one or more musical patterns which are tied to a particular root note.

Although it is possible to have an uneven distribution of ridges, in an embodiment the at least three ridges are evenly distributed about the longitudinal axis of the musical aid. In such an embodiment the profile of the elongate body is substantially the same in many different orientations and so this means that the musical aid will sit stably on the keyboard in these orientations.

It is possible to provide flat surfaces between adjacent ridges so that the cross section of the elongate rod is a regular polygon such as a triangle or square. However, a particularly advantageous ridge structure is one in which a concave surface is formed between adjacent ridges. A concave surface contacts the keys of the keyboard at two different points of the surface, whereas a flat surface would contact the keys at only one point. Thus, providing a concave surface between ridges can increase the surface area of the musical aid in contact with the keyboard and so can reduce the amount of slippage of the musical aid relative to the keyboard, both lengthways along the keyboard and also towards the front of the keyboard. Moreover, the ridge providing the rear-most point of contact will then tend to fall down behind the keys of the keyboard to inhibit slippage towards the front of the keyboard. It will be appreciated that such a concave surface need not necessarily form a regular curve (although in some embodiments it may do)—it may simply provide a generally "hollowed" internal region between adjacent ridges.

The at least three ridges may be shaped such that when the musical aid is located on the keyboard in the orientation in which the root key-indicating marker of the selected side surface is positioned above any key of the keyboard, one of the ridges not having the selected side surface engages with a groove running behind the keys of the keyboard. This ridge structure helps to maintain the musical aid in position when in use so that the musical aid does not shift towards the front of the keyboard when the keys of the keyboard are played. One example of such a groove-engaging ridge structure is one in which a concave region is provided between adjacent ridges, as described above.

In an embodiment, the at least three ridges may be shaped such that, when the musical aid is located on the keyboard in said orientation, an angle formed between the selected side surface and an upper surface of the keys of the keyboard is an obtuse angle. When playing a keyboard, the keyboard player's eye is typically located a distance above and away from the keys of the keyboard. By providing a certain number (say, 3 or 4) of ridges and shaping those ridges so that an obtuse angle is formed between the selected side surface and the surface of the keys when the musical aid is located on the keyboard, then in use the side surface will be angled away from the keyboard player so as to be at a convenient angle for the keyboard player to see the key-indicating markers. This improves the ease of use of the musical aid.

In some embodiments, the at least three ridges comprise continuous ridges extending along the whole length of the elongate body. However, it is also possible to provide at least one ridge in the form of a plurality of discontinuous ridge portions with one or more of the ridge portions carrying at least one key-indicating marker on one or both of its two side surfaces. Unless specifically stated, the terms "ridge" and "side surface" should be construed as encompassing both a ridge or side surface formed of one continuous portion and a ridge or side surface formed of multiple discontinuous portions. While each ridge has two side surfaces for carrying key-indicating markers, the ridges may have other surfaces as well.

The elongate body may comprise three ridges. For example, the elongate body may have a cross-section of a three-pointed star with each point representing one of the ridges. Three ridges provide six side surfaces for carrying up to six sets of key-indicating markers. A musical aid having a three-ridged elongate body can represent hundreds of types of musical pattern, and over a thousand different musical patterns. The three-ridged elongate body is convenient since in any orientation of the musical aid, two ridges are placed on the keys to support the musical aid (one of these engaging with the groove behind the keys of the keyboard), while the third ridge projects upwards to avoid obscuring the selected side surface located on the one of the supporting ridges that faces towards the keyboard player.

The musical aid may alternatively comprise four ridges. A four-ridged elongate body has more surfaces for carrying sets of key-indicating markers, so can represent more types of musical pattern than three-ridged embodiments.

Five or more ridges may be provided on the elongate body to carry more sets of key-indicating markers than three or four ridges. However, as more ridges are provided, the ridges will be located more closely together around the longitudinal axis of the elongate body and so it will become more difficult for the keyboard player to see the key-indicating markers of the selected side surfaces (with more ridges, one of the ridges not carrying the selected side surface may obscure the selected side surface). Furthermore, an increased number of ridges would serve to reduce the footprint provided by two adjacent ridges, and thus the stability, of the musical aid when placed on the keyboard. Thus, the selection of the number of ridges is a compromise between the number of represented types of musical patterns and the ease of use of the musical aid. If it is desired to represent a large number of musical pattern types, then providing two separate musical aids each with fewer ridges can sometimes be more convenient for the user than a single musical aid with many ridges.

In an embodiment, the maximum spacing between any two key-indicating markers in the same set may correspond to an interval of the keyboard that is not greater than two octaves. Although ideally the inter-key spacing is constant across the full range of the keyboard, in practice imperfections in the construction of the keyboard can cause some variation in the widths of the keys. Therefore, if the musical aid were to cover the entire length of the keyboard, it is possible that when the root key-indicating marker is aligned with the root key of a particular musical pattern, the key-indicating markers furthest from the root key-indicating marker would not be aligned with the keys they are supposed to indicate.

This problem can be mitigated by reducing the range covered by the musical aid. When the musical aid extends across fewer keys, the sum of the deviations in width (from an ideal key width) for each key covered by the musical aid will be smaller. Therefore, there will be a reduced probability that imperfections in the keyboard will prevent the key-indicating markers furthest from the root key-indicating marker from indicating the correct keys of the keyboard. One or two octaves are usually enough to indicate most types of musical pattern, since the keyboard player can simply repeat the pattern at higher octaves if they wish. On the other hand, some musical patterns such as jazz chords may use notes (e.g. ninths, elevenths or thirteenths) that are between one and two octaves above the root note. By limiting the range of the musical aid so that the maximum spacing between any two markers in the same set is no greater than two octaves of the keyboard, the chance of the markers indicating the wrong notes is reduced while still enabling the musical aid to indicate most types of musical pattern, including jazz chords.

The probability of the key-indicating markers not aligning with the keys of the keyboard can be reduced even further by reducing the maximum spacing between any two key-indicating markers in the same set to an interval of the keyboard that is not greater than an augmented ninth. Many common types of musical patterns do not use notes that are separated by more than an augmented ninth from the root note (an augmented ninth is an interval formed between two notes separated by an octave and three semitones), and so for such musical patterns there is no need to extend the range indicated by the key-indicating markers any further.

The types of musical pattern may comprise scales, arpeggios and chords. The same set of key-indicating markers may indicate both chords and arpeggios, with the arpeggio played by playing the indicated notes one by one, and the chord played by playing the indicated notes at the same time. A single musical aid can be dedicated to representing only scales, or only chords and arpeggios, or could have different side surfaces depicting scales, and chords/arpeggios. Example types of scales which can be represented by the musical aid include major, melodic minor, harmonic minor, whole tone, or modal (Lydian, Phrygian, Dorian, Mixolydian, Aeolian, Locrian or Ionian) scales. Examples of types of chords or arpeggios which can be represented by the musical aid include major, minor, suspended, augmented or diminished fifth, dominant seventh, diminished seventh, major seventh, ninth, or augmented or diminished ninth chords or arpeggios. Jazz chords and scales can also be represented if desired.

At least one side surface may carry a set of key-indicating markers representing a group of a plurality of different types of chord. The musical aid is therefore made more compact, since it is now possible to use another side surface to represent another group of chord types for which there would not be space if the plurality of different types of chord were represented using multiple sets of key-indicating markers.

In an embodiment, the set of key-indicating markers of the at least one side surface may comprise a plurality of first key-indicating markers representing a first chord type, and one or both of:
(a) at least one second key-indicating marker which, in combination with the plurality of first key-indicating markers other than a predetermined first key-indicating marker, represents a second chord type; and
(b) at least one third key-indicating marker which, in combination with all of the keys indicated by the first key-indicating markers, represents a third chord type.

A compact way of indicating several different chord types with a single set of key-indicating markers is to provide two or three different marker types. First key-indicating markers indicate keys which act as a basis for most chords indicated by the set. The first key-indicating markers can be used to indicate basic chord types, such as major, minor, diminished, augmented, suspended, or dominant seventh chords, for example.

At least one second key-indicating marker may indicate at least one key which can be played instead of a key indicated by a predetermined first key-indicating marker. For example, the predetermined first key-indicating marker could be the marker corresponding to the fifth note of a major or minor chord and diminished or augmented fifth chords could be indicated by a second key-indicating marker which indicates a note to be substituted for the fifth note. Alternatively, the predetermined first key-indicating marker could be the marker corresponding to the third note of a major or minor chord, and suspended second or suspended fourth chords could be indicated by a second key-indicating marker which indicates a note to be substituted for the third note.

At least one third key-indicating marker may indicate at least one key which can be played in combination with the keys indicated by the first type of marker. This enables suspensions, sevenths, ninths, and other additional notes to be added to the notes of the basic chord type indicated by the first key-indicating markers.

Either or both of the second and third key-indicating markers may be provided. Each different permutation of first, second and third key-indicating markers represents a different chord type, and each chord type can be applied to any of the twelve root notes, and so a single set of key-indicating markers on one side surface of the musical aid can represent many different chords.

The plurality of first key-indicating markers may be visually distinguishable from the one or both of the at least one second key-indicating marker and the at least one third key-indicating marker. For example, the different types of key-indicating markers may be distinguished by one or more of different colours, shapes, pictures, numerals, letters or distance from the edge of the side surface. The markers may be formed flat on the surface of the side surface, or may protrude outwards from the side surface if desired (the different types of key-indicating markers could then be indicated by different profiles). The markers may also be provided in an electronic form, for example as different coloured LEDs on the surface of the elongate body.

The key-indicating markers of a set may be arranged in a single row on the corresponding side surface. This means that each key-indicating marker can be positioned directly above the corresponding key of the keyboard, without another marker between the key-indicating marker and the corresponding key, and so it is easy for the player to see which keys are indicated by the set of key-indicating markers without risk of confusion between multiple sets of key indicating markers (as in the device of U.S. Pat. No. 3,350,973).

The root key-indicating marker of a set may be the left-most key-indicating marker of the set. For the most common scales, chords and arpeggios, the root note will be the lowest note in the musical pattern. Thus, the left-most (first) key-indicating marker of a set will most often be the root key-indicating marker. Even if the user wishes to play first or second inversion chords which have a lowest note other than the root note, the user can simply play the chord in the same way as in the root position with his/her right hand (with the root note at the bottom of the chord) and then play the lowest note of the inverted chord in the bass with his/her left hand in order to achieve the effect of the inversion. This embodiment has the advantage that a separate side surface is not required for each inversion—all three inversions can be represented by a single side surface.

Alternatively, a set of key-indicating markers can be provided with a root key-indicating marker that is not the left-most key-indicating marker of the set. This enables the first and second inversion chords to be represented exactly by the musical aid. The player aligns the root key-indicating marker with the desired key on the keyboard, and then plays the keys indicated by the remaining key-indicating markers of the set (including at least one marker that is to the left of the root key-indicating marker).

The elongate body may be a one-piece body having the key-indicating markers formed upon its outer surface.

Alternatively, the elongate body may have a sleeve shaped to fit over the elongate body, the sleeve being removable from the elongate body, and the sets of key-indicating markers may be carried on the outside of the sleeve of the elongate body.

A single musical aid may not have enough side surfaces to represent all the different types of musical pattern desired. In this case, a greater number of different types of musical pattern can be represented by providing the elongate body with a removable sleeve for carrying the key-indicating markers. The sleeve fits over the elongate body and can be replaced with another sleeve in order to change the configuration of sets of markers. For example, a sleeve carrying sets of markers for indicating chords can be removed from the elongate body and replaced with a sleeve carrying sets of markers for indicating scales, so that the same musical aid can be converted to represent different combinations of musical patterns.

Thus, the elongate body can carry its key-indicating markers either on its surface or on an interchangeable outer sleeve.

Viewed from another aspect, the present invention provides a sleeve for a musical aid comprising an elongate body having at least three ridges extending outwardly from and linearly along the musical aid, each ridge having two side surfaces; wherein:

the sleeve is shaped to fit over the elongate body of the musical aid;

the sleeve carries at least two sets of key indicating markers, each set of key-indicating markers being positioned such that when the sleeve is placed over the elongate body, the at least two sets of key indicating markers are carried on at least two different side surfaces of the at least three ridges, each set of key-indicating markers representing a different group of one or more types of musical pattern; and the key-indicating markers of each set are spaced such that when the musical aid, with the sleeve fitted on the elongate body, is located on the keyboard in an orientation in which a selected side surface is at a position at which a root key-indicating marker of the set carried by the selected side surface is positioned above any key of the keyboard, the key beneath the root key-indicating marker forms the root note of a group of one or more musical patterns of the types represented by the set carried by the selected side surface, and the remaining key-indicating markers of the set carried by the selected side surface are positioned above keys of the keyboard that correspond to the remaining notes of the group of musical patterns.

Additional sleeves for the elongate body may be provided for a musical aid. The sleeves can be exchanged to change the groups of types of musical pattern indicated by the musical aid.

Viewed from another aspect, the present invention provides a musical aid apparatus comprising:

a first musical aid according to the present technique; and
a second musical aid according to the present technique;
wherein:
the elongate body of the first musical aid is hollow; and
the second musical aid is shaped to fit inside the hollow elongate body of the first musical aid.

Another way of increasing the number of groups of types of musical pattern is to use two or more musical aids each indicating respective groups of musical pattern types. In this case, a compact and efficient musical aid apparatus may be provided comprising a first musical aid with a hollow elongate body and a second musical aid dimensioned to fit inside the elongate body of the first musical aid. Thus, the first musical aid provides a convenient storage for the second musical aid. If there are three or more musical aids then these may be arranged inside one another in a similar way to a Russian doll.

Further aspects of the invention include a system comprising a musical keyboard and a musical aid and/or a musical aid apparatus.

Viewed from another aspect, the present invention provides a method of playing a desired musical pattern on a musical keyboard using a musical aid comprising an elongate body having at least three ridges extending outwardly from and linearly along the musical aid, each ridge having two side surfaces, at least two different side surfaces of the at least three ridges carrying respective sets of key-indicating markers, each set of key-indicating markers representing a different group of one or more types of musical pattern;

the method comprising the steps of:

selecting a side surface of the musical aid that carries a set of key-indicating markers representing a group of one or more types of musical pattern that includes a type corresponding to the desired musical pattern;

locating the musical aid on the keyboard in an orientation in which the key-indicating markers of the selected side surface are adjacent to the keys of the keyboard;

positioning the musical aid such that a root key-indicating marker of the set carried by the selected side surface is positioned above a key of the keyboard that corresponds to a root note of the desired musical pattern; and playing the desired musical pattern by playing the key positioned below the root key-indicating marker and at least one key positioned below at least one of the remaining key-indicating markers of the set carried by the selected side surface.

The above, and other objects, features and advantages of this invention will be apparent from the following detailed description of illustrative embodiments which is to be read in connection with the accompanying drawings.

BRIEF DESCRIPTION OF THE DRAWINGS

Embodiments of the present invention will now be described by way of example only with reference to the accompanying drawings where like parts are provided with corresponding reference numerals and in which:

FIGS. 4A and 4B illustrate the use of a musical aid to play scales;

DESCRIPTION OF THE EXAMPLE EMBODIMENTS

Figure 1:
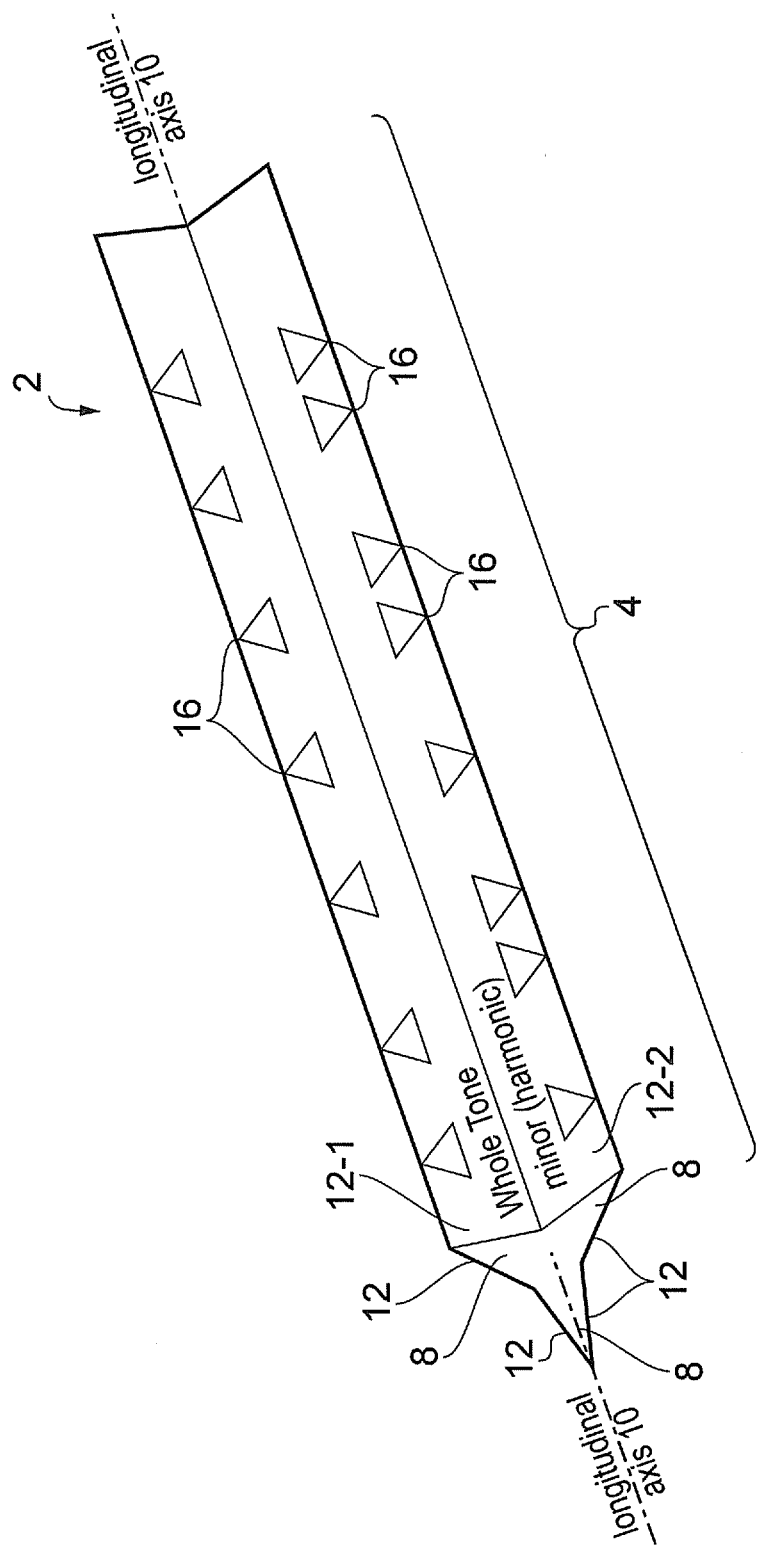
FIG. 1 illustrates an embodiment of a musical aid comprising an elongate body with ridges.

FIG. 1 illustrates a musical aid 2 according to a first embodiment. The musical aid 2 comprises an elongate body 4 having three ridges 8 which extend outwardly from and longitudinally along the elongate body 4. In this embodiment, the ridges 8 are evenly distributed about the longitudinal axis 10 of the elongate body 4, and the cross-section of the elongate body 4 has rotational symmetry (although this is not essential).

Each ridge has two side surfaces 12 for carrying respective sets of key-indicating markers 16. Each set of key-indicating markers indicates a different group of one or more types of musical pattern. At least two of the side surfaces carry key-indicating markers 16. Clearly, more types of musical pattern can be indicated by the musical aid 2 when most or all of the side surfaces carry key-indicating markers 16. In the present example, the musical aid 2 has one side surface 12-1 indicating the notes of a whole tone scale, and another side surface 12-2 indicating the notes of a harmonic minor scale.

By rotating the musical aid 2 about its longitudinal axis 10, and flipping it horizontally or vertically so that it is upside-down, the musical aid 2 can be placed in different orientations so that different ones of the side surfaces 12 are located in a position in which the associated key-indicating markers 16 indicate keys of a musical keyboard. For example, when the surface 12-2 indicating the notes of the harmonic minor scale is currently selected to be in the position in which the key-indicating markers 16 of the surface 12-2 are pointing towards the keys of the keyboard, then by flipping the musical aid 2 upside down the surface 12-1 indicating the notes of the whole tone scale can be selected instead. Alternatively, rotating the musical aid 2 about its axis 10 causes other side surfaces 12 to be selected.

Figure 2:
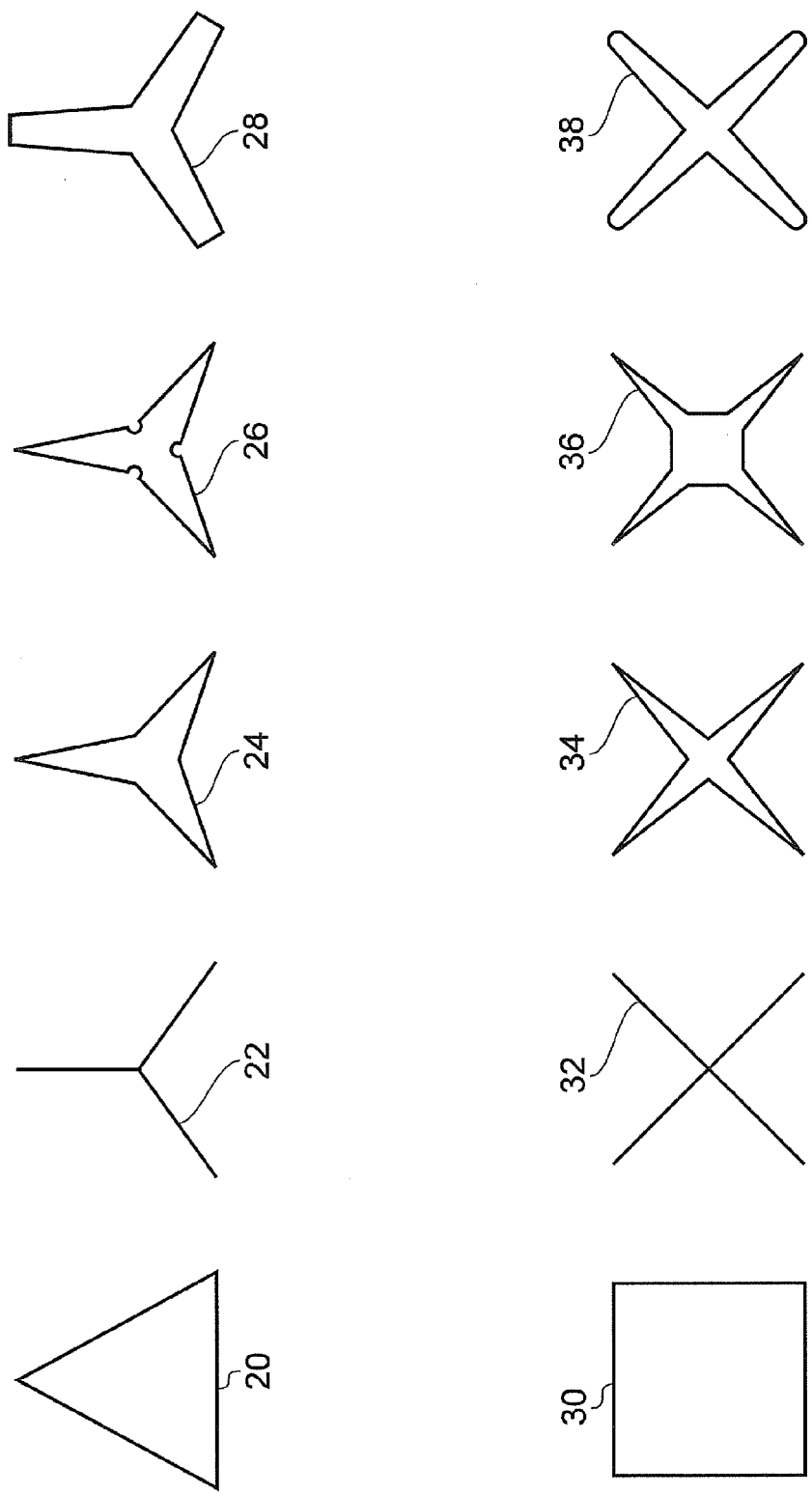
FIG. 2 illustrates examples of possible cross-sections of an elongate body of a musical aid.

FIG. 2 illustrates various examples of possible cross-sections for the elongate body 4 of the musical aid 2. The elongate body 4 can have three ridges 8, as with the three-pointed cross-sections 20, 22, 24, 26, 28 or four ridges, as with the four-pointed cross-sections 30, 32, 34, 36, 38. A greater number of ridges 8 is also possible.

The ridges may be the edge portions of a polygonal prism having the cross section of a regular polygon, such as the triangular cross-section 20 or the square cross-section 30. In this case, the elongate body is a triangular prism or cuboid, the ridges are the edge portions of the body and the two side surfaces of each ridge are the portions of the faces of the body closest to each edge.

Alternatively, the elongate body 4 can be formed so that concave surfaces are formed between pairs of adjacent ridges. For example, cross-sections 22, 24, 26, 28, 32, 34, 36, 38 all have concave surfaces between the tips of adjacent ridges. The concave surface is particularly useful because it enables the ridges to engage with a groove behind the keys of the keyboard (thereby reducing slippage of the musical aid with respect to the keyboard) and causes the side surfaces to be presented at an obtuse angle when the musical aid is in use (see FIG. 3 which will be discussed below).

The ridges 8 may simply extend outwards from a central point of the elongate body, as in the example cross-sections 22 and 32. Alternatively, the cross-section may be in the form of a three- or four-pointed star 24, 34. The exact shape of the portion of the elongate body 4 that links the different ridges is not particularly important. For example, the ridges may meet at a point (see cross-sections 24, 33), or there may be a shaped or flattened portion joining the ridges 8 (see cross-sections 26, 36).

At the far end of the ridges 8, the side surfaces 10 may meet at a point (see cross-sections 20, 22, 24, 26, 30, 32, 34, 36), or can be separated by a flattened or rounded surface (see cross-sections 28 and 38). The ridge 8 can therefore be shaped to have more than two side surfaces 12 if desired, although generally the ridge 8 has two oppositely directed side surfaces 12 for accommodating the key-indicating markers 16.

Figure 3:
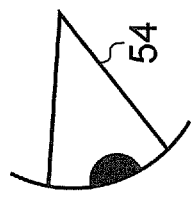
FIG. 3 illustrates the interaction between a musical aid, a musical keyboard and a keyboard player.
Figure 3:
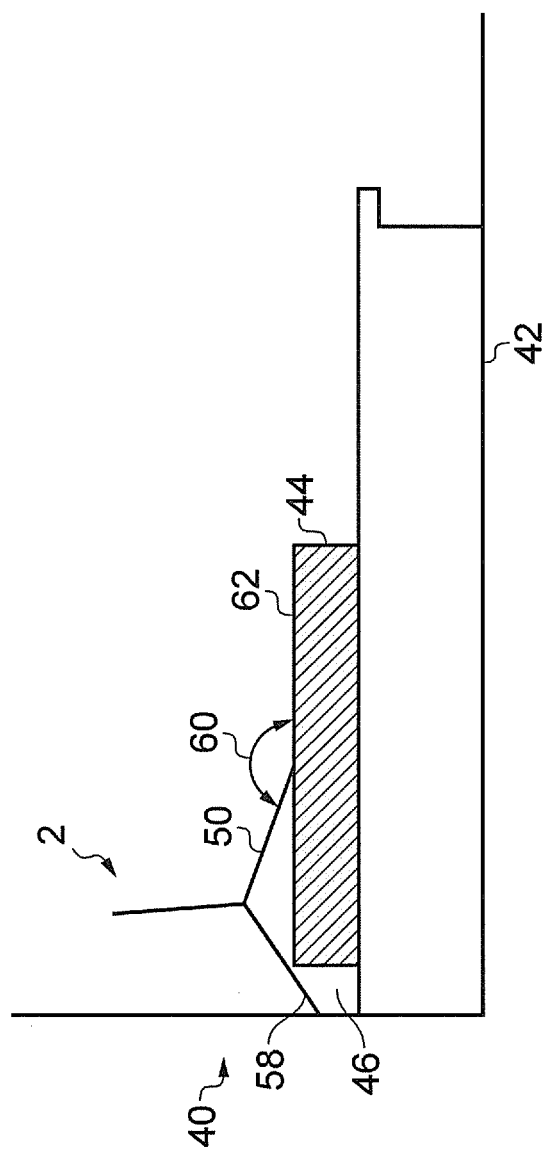

FIG. 3 shows a cross-section through a musical keyboard 40 with the musical aid 2 located upon the keyboard 40 when in use. The keyboard 40 has white keys 42 and black keys 44 which extend a small distance above the white keys 42. A groove 46 runs behind at least the black keys 44 of the keyboard 40 (the groove may in some cases also extend behind the white keys 42).

When the musical aid 2 is in use, it is located on the keys of the keyboard 40. The musical aid 2 sits on the upper surface of the black keys 44, and is orientated such that a selected side surface 50 of the musical aid 2 points towards the keyboard player 54. The selected side surface 50 is the side surface 12 which carries the set of key-indicating markers which represent a group of one or more types of musical pattern including a type of musical pattern which the keyboard player 54 desires to play.

The shape of the ridges of the musical aid 2 causes one of the ridges 58 other than the ridge carrying the selected side surface 50 to engage with the groove 46 running behind the keys of the keyboard 40. This anchors the musical aid 2 in position and prevents the musical aid 2 moving towards the front of the keyboard 40 when the keyboard player 54 plays the keys 42, 44.

The shape of the ridges also ensures that when the musical aid is in use, an angle 60 formed between the selected side surface 50 and the upper surface 62 of the black keys is an obtuse angle (between 90 and 180 degrees). This is useful because this means that the selected side surface 50 will be angled slightly upwards. This makes the selected side surface 50 easier to see for the keyboard player 54, whose eye would typically be located a distance above and away from the keyboard 40. For example, for three evenly distributed ridges the angle 60 can be made to be between 120 and 180 degrees (depending on the shape of the ridges and the extent to which the musical aid 2 rotates when dropping into the groove 46), and for four evenly distributed ridges the angle 60 would be between 90 and 180 degrees (again depending on the shape of the ridges and the extent to which the musical aid 2 engages with the groove 46). Other angles would be achievable by way of an uneven distribution of ridges.

While FIG. 3 shows a specific cross-section 20 for the elongate body 4, other types of cross-section can also enable the musical aid 2 to engage with the groove 46 and enable the selected side surface 50 to be angled relative to the keyboard 40. For example, elongate bodies 4 of the cross-sections 22, 24, 26, 28, 32, 34, 36, 38 having concave surface portions as shown in FIG. 2, as well as other ridged bodies, can achieve the same effects.

FIGS. 4A and 4B illustrate examples of how the musical aid 2 can be used to play scales. In this example, the musical aid 2 has side surfaces 120, 122 having respective sets of key-indicating markers indicating the notes of major and harmonic minor scales. A left-most key-indicating marker of each set (when viewed in the orientation in which the corresponding set is selected for use with the keyboard) is a root-key indicating marker 126, 128.

In the example shown in FIG. 4A, the desired musical pattern is a B major scale. Therefore, the player 54 orientates the musical aid 2 so that the side surface 120 corresponding to the major scale is positioned above to the keys of the keyboard 40. The player 54 then positions the musical aid 2 so that the root key-indicating marker 126 of the selected side surface 120 is positioned above the key corresponding to the root note of the desired musical pattern, which in this example is a B key 130.

The root key-indicating marker 126 and remaining key-indicating markers 132 of the set corresponding to the selected side surface 120 are now positioned above the notes of the desired musical pattern (a B major scale). To play the B major scale, the player then plays all the notes indicated by the key-indicator markers 126, 132 in turn: B, C#, D#, E, F#, G#, A#, B.

If the player 54 wants to play a major scale for a different root note, the player 54 then shifts the musical aid 2 so that the root key-indicating marker 126 is positioned above a different key (for example, the D key 140 as shown in FIG. 4B). Since the inter-key spacing 144 of the black and white keys is substantially constant at the rear portion of the keys along the length of the keyboard, then the spacing between the key-indicating markers 126, 132 will continue to indicate the notes of the major scale regardless of which key is aligned with the root key-indicating marker 126. In the example of FIG. 4B, the key-indicating markers 126, 132 correctly indicate the notes of the D major scale: D, E, F#, G, A, B, C#, D.

If the player 54 wishes to play a different type of musical pattern, then he/she reorients the musical aid 2 so that a different side surface 12 is pointing towards the keys of the keyboard 40 and again aligns the root key-indicating marker with the key for playing the root note of the musical pattern.

Figure 5A:
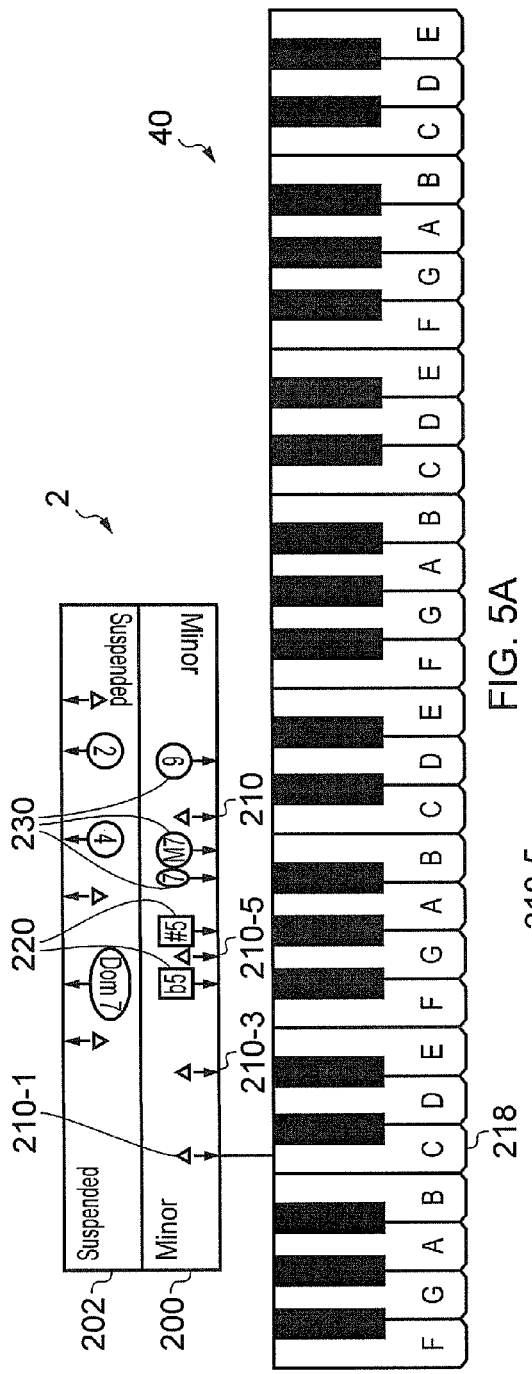
FIGS. 5A and 5B illustrate the use of a musical aid to play chords, the musical aid having at least one set of key-indicating markers that represents multiple different types of chords.
Figure 5B:
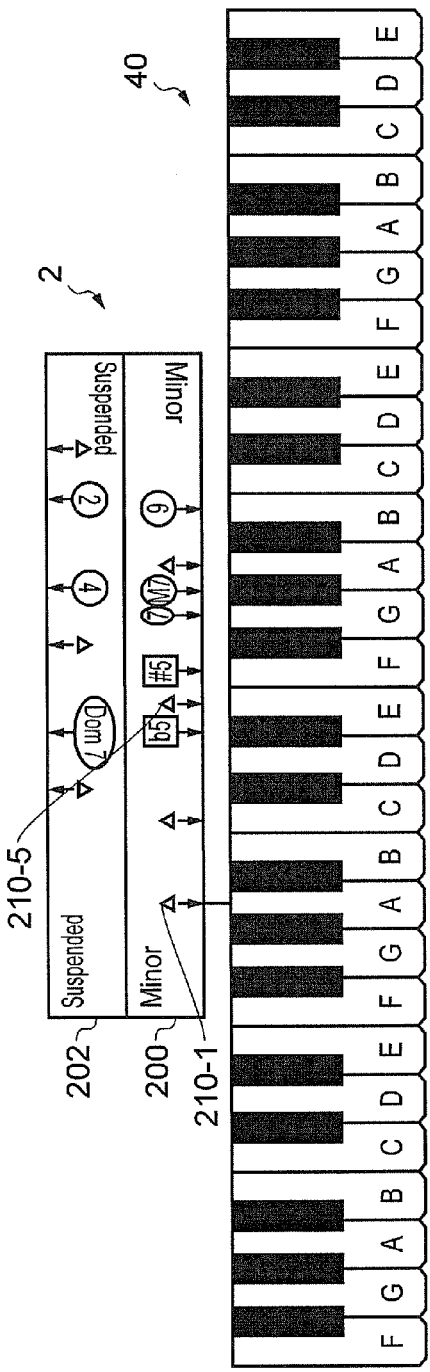

FIGS. 5A and 5B show another example of a musical aid 2 in which two side surfaces represent respective groups of chord types. One side surface 200 carries key-indicating markers indicating the notes of a minor chord as well as other key-indicating markers indicating how the minor chord can be modified to introduce diminished (b5), augmented (#5), seventh (7), major seventh (M7) and ninth (9) notes. The key-indicating markers of the side surface 200 are of three types which are visually distinguished from one another, in this example by different shaped markers. The different types of key-indicating markers could also be distinguished by different colours, pictures, letters, numerals, distance from the edge of the side surface, or other means.

First key-indicating markers 210 indicate the keys for playing a first type of chord, in this example a minor chord. In the example of FIG. 5A, the first key-indicating markers 210 are indicated using triangles. One of the first key-indicating markers 210 is the root-key indicating marker 210-1. When the musical aid 2 is placed on the keyboard 40 with the root-key indicating marker 210-1 positioned above any key (e.g., a C key 218), the keys positioned below the first key-indicating markers 210 are the keys for playing the C minor chord (C, Eb, G, C). These keys can be played together to play the C minor chord, or in sequence to play the C minor arpeggio.

Second key-indicating markers 220 indicate keys which can be substituted for the key indicated by a predetermined first key-indicating marker, in order to change the first type of chord to one or more other types of chord. In this example, the second key-indicating markers 220 are indicated using spines, and the predetermined first key-indicating marker 210 is the marker 210-5 that indicates the fifth of the chord. By playing the first two first key-indicating markers 210, and a key indicated by one of the second markers 220 instead of the key positioned below the predetermined first key-indicating marker 210-5, the chord is changed to a diminished (b5) or augmented (#5) chord.

In other embodiments the second type of key-indicating marker 220 could indicate keys which can be played instead of the third of the chord (the key indicated by marker 210-3 in FIG. 5A) to change the minor chord into a suspended second or suspended fourth chord.

Third key-indicating markers 230 indicate keys which can be played in combination with the keys of any of the chords indicated by the first and second key-indicating markers. For example, in the embodiment of FIG. 5A the third key-indicating markers 230 are indicated by circles and indicate keys that can be played to add a seventh, major seventh or ninth to the chord. More than one of the keys indicated by third key-indicating markers 230 can be added to the chord if desired (e.g., by playing the keys indicated by the first key-indicating markers 210 and the Bb and D keys indicated by the third key-indicating markers 230 for the seventh and ninth, a C minor seventh ninth chord can be played).

As shown in FIG. 5A, by providing three different types of key-indicating markers which respectively indicate keys of a basic chord type, keys for replacing keys of the basic chord type to produce other chord types, and keys for combining with the keys of the basic chord type to produce further chord types, many permutations of chord types can be represented using only a single set of key-indicating markers 210, 220, 230 which are laid out in a single row on one of the side surfaces 12 of the musical aid 2. For example, the side surface 200 of FIG. 5A can represent at least 18 different chord types. These chord types can be applied to the twelve different root notes of the octave, and so the single side surface 200 can on its own represent at least 216 chords. More chord types can be added by adding additional second or third markers.

For example, eleventh or thirteenth chords could be provided by adding additional third markers. Alternatively, instructions could be provided to enable a person to play eleventh or thirteenth chords even without specific chord markers for playing these chords. The eleventh note is an octave higher than the note at an interval of a fourth from the root note, and the thirteenth note is an octave higher than the note at an interval of a sixth from the root note. Therefore, the eleventh and thirteenth chords can be played by adding a note that is an octave higher than the note indicated by a marker indicating the fourth or sixth notes.

If all the side surfaces 12 of the musical aid 2 are provided with similar sets of key-indicating markers, then the musical aid 2 can represent over a thousand different musical patterns.

Further types of key indicating markers (e.g. a fourth or fifth type) could also be devised to combine with the other types of markers if desired.

FIG. 5B shows a second example of the musical aid 2 being used to play a minor chord. Again, the spacing of the key-indicating markers is such that whichever key of the keyboard 40 is positioned below the root-key indicating marker 210-1, the remaining key-indicating markers indicate the keys for playing a group of chords each having the key positioned below the root-key indicating marker 210-1 as a root note. For example, in FIG. 5B the first key-indicating markers indicate notes of an A minor chord, with second and third key-indicating markers indicating variations on the minor chord such as A diminished minor, A augmented minor, A minor 7, A minor M7, A minor 9, and other permutations of the indicated notes.

Figure 6:
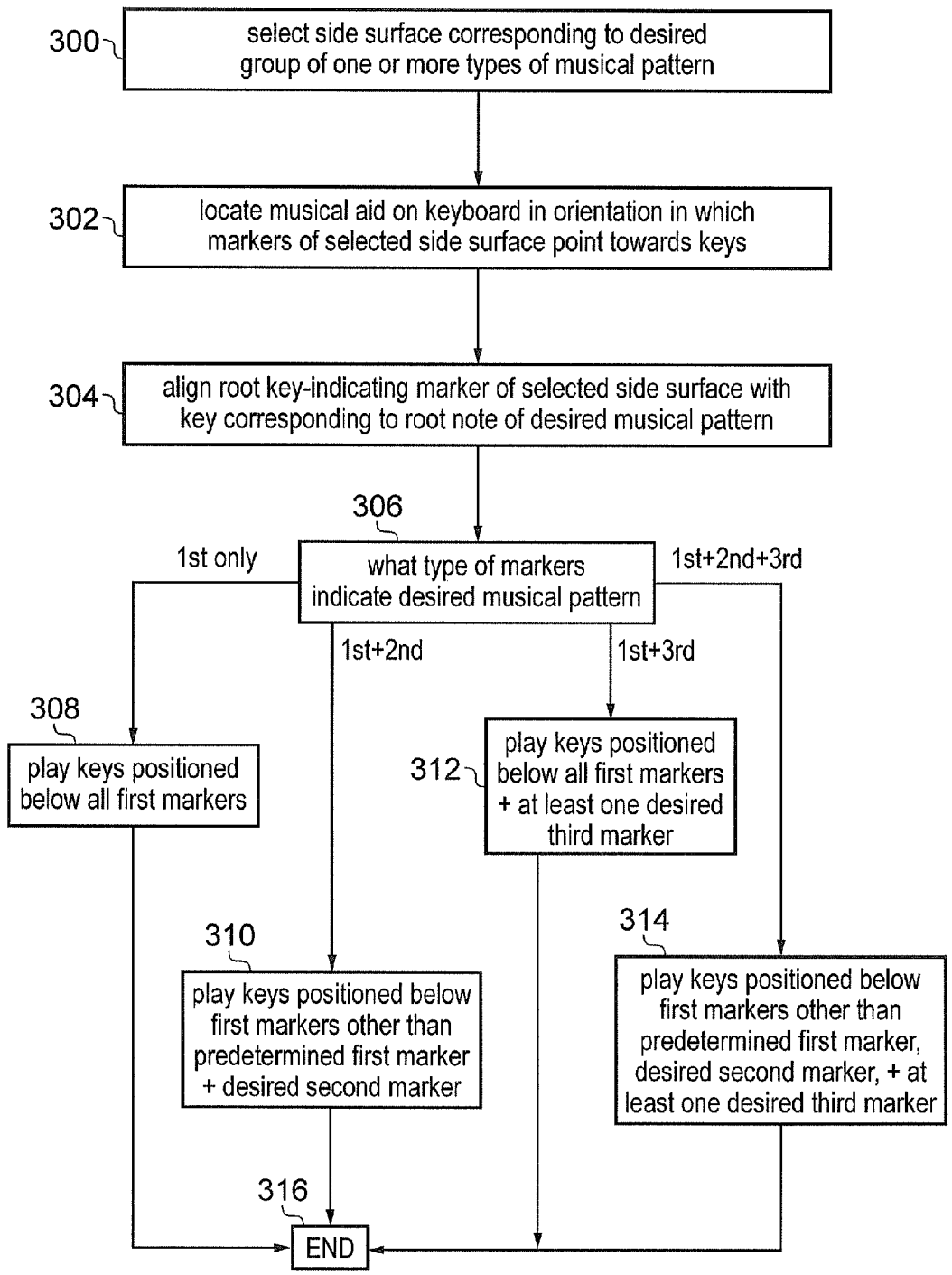
FIG. 6 illustrates a method for using a musical aid.

FIG. 6 illustrates a method of using the musical aid 2 to play a desired musical pattern. At step 300, a side surface 12 is selected that corresponds to a desired group of one or more types of musical pattern (i.e. the group that includes the type of the desired musical pattern). At step 302, the musical aid 2 is located on the keyboard 40 in an orientation in which the markers of the selected side surface 12 point towards the keys. Then, at step 304 the root key-indicating marker of the selected side surface 12 is aligned with a key corresponding to the root note of the desired musical pattern.

At step 306 it is determined what types of markers indicate the desired musical pattern. If only first key-indicating markers are required then the method proceeds to step 308. For example, only first key-indicating markers may be used when the desired musical pattern is a scale (see FIG. 4A or 4B) or a basic chord type that does not require any second or third key-indicating markers (see FIG. 5A or 5B). At step 308, then the keys positioned below all the first key-indicating markers of the selected side surface 12 are played to play the desired musical pattern. For example, in FIG. 5B the keys A, C, E and A positioned below the triangular first key-indicating markers would be played together to play the A minor chord.

At step 306, if first key-indicating markers and second key-indicating markers are required to play the desired musical pattern then the method proceeds to step 310. Second key-indicating markers may be required for example in order to play diminished, augmented, or suspended chords. In step 310 the keys positioned below the first key-indicating markers other than the predetermined first key-indicating marker are played, as well as the key positioned below a desired second key-indicating marker. For example, in FIG. 5B if the A augmented minor chord is desired, then the player plays the keys A and C and A (positioned below first key-indicating markers other than the predetermined first key-indicating marker 210-5) and the key F (positioned below the desired second key-indicating marker #5 for playing the augmented chord). Thus, the keys A, C, F and A make up the A augmented minor chord.

At step 306, if first key-indicating markers and third key-indicating markers are required to play the desired musical pattern then the method proceeds to step 312. Third key-indicating markers may be required to add second, fourth, seventh, ninth or higher notes to a chord, for example. At step 312 the keys positioned below all first key-indicating markers are played together with a desired one or more third key-indicating markers. For example, in FIG. 5B if an A minor M7 9 chord is the desired musical pattern, then the player plays keys A, C, E and A indicated by all the first key-indicating markers, as well as the keys G# and B positioned below the third key-indicating markers M7 and 9 indicating the major seventh and ninth notes of the chord. Thus, the notes A, C, E, G#, A and B form the A minor M7 9 chord.

At step 306, if first key-indicating markers, second key-indicating markers and third key-indicating markers are required to play the desired musical pattern then the method proceeds to step 314. At step 314 the keys positioned below the first key-indicating markers other than the predetermined first key-indicating marker, a desired second key-indicating marker, and one or more desired third key-indicating markers are played. For example, in FIG. 5B to play an A minor seventh chord with diminished fifth, the player plays keys A, C and A positioned below the first key-indicating markers other than the predetermined key-indicating marker 210-5, the key D# positioned below the desired second key-indicating marker b5 corresponding to the diminished note, and the key G positioned below the third key-indicating marker 7. These notes A, C, D#, G, A form the A minor seventh chord with diminished fifth.

It will be appreciated that it is not essential that each set of key-indicating markers has the second and third key-indicating markers. None, one or both of the second and third key-indicating markers may be provided in a set in dependence on the types of musical pattern which are to be represented by the set.

In the above embodiments, the root key-indicating marker is the left-most key-indicating marker of each set of key-indicating markers 16. However, some types of musical pattern, such as first or second inversion chords, do not have the root note at the bottom of the musical pattern. Instead, the musical pattern has at a bass note other than the root note. To play such musical patterns with the musical aid 2 of the above embodiments, the player plays the musical pattern with his/her right hand in the way shown in FIG. 6, but then adds a note with his/her left hand in order to provide the bass note of the chord. For example, a second inversion G major chord (which has notes D, G, B, D) can be played by playing a G major chord (G, B, D) with the right hand using the musical aid 2 as explained above, and playing the bass note (D) with the left hand to provide the second inversion chord. Instructions can be provided together with the musical aid to explain how to play the inverted chords. By playing inverted chords in this way and not providing separate side surfaces for each different inversion, space on the side surfaces is conserved so that other side surfaces can be used for other types of musical pattern.

Alternatively, separate side surfaces 12 can be used to represent the different inversions of a single chord type, with some side surfaces 12 that indicate a first or second inversion chord having a root key-indicating marker that is not the left-most key-indicating marker on the side surface 12. In this case, the root key-indicating marker should be visually distinguished from other markers of the set.

Figure 7:
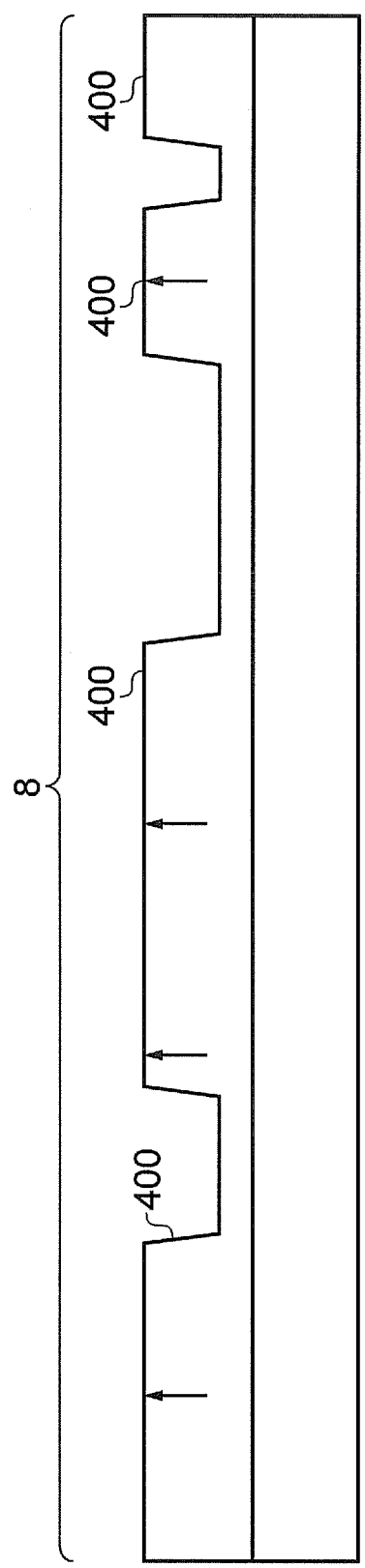
FIG. 7 illustrates an embodiment of a musical aid in which at least one ridge is discontinuous.

In the above embodiments, the ridges 8 extend continuously along the elongate body 4 of the musical aid 2. Continuous ridge portions are useful because they ensure that the musical aid 2 will sit flush on the upper surface of the keys of the keyboard 40. However, this is not essential, and embodiments can be produced in which at least one ridge 8 comprises several discrete ridge portions. For example, in FIG. 7, one ridge 8 has four discontinuous ridge portions 400 extending along the length of the elongate body 4, with each ridge portion 400 carrying zero, one or more key-indicating markers.

Figure 8:
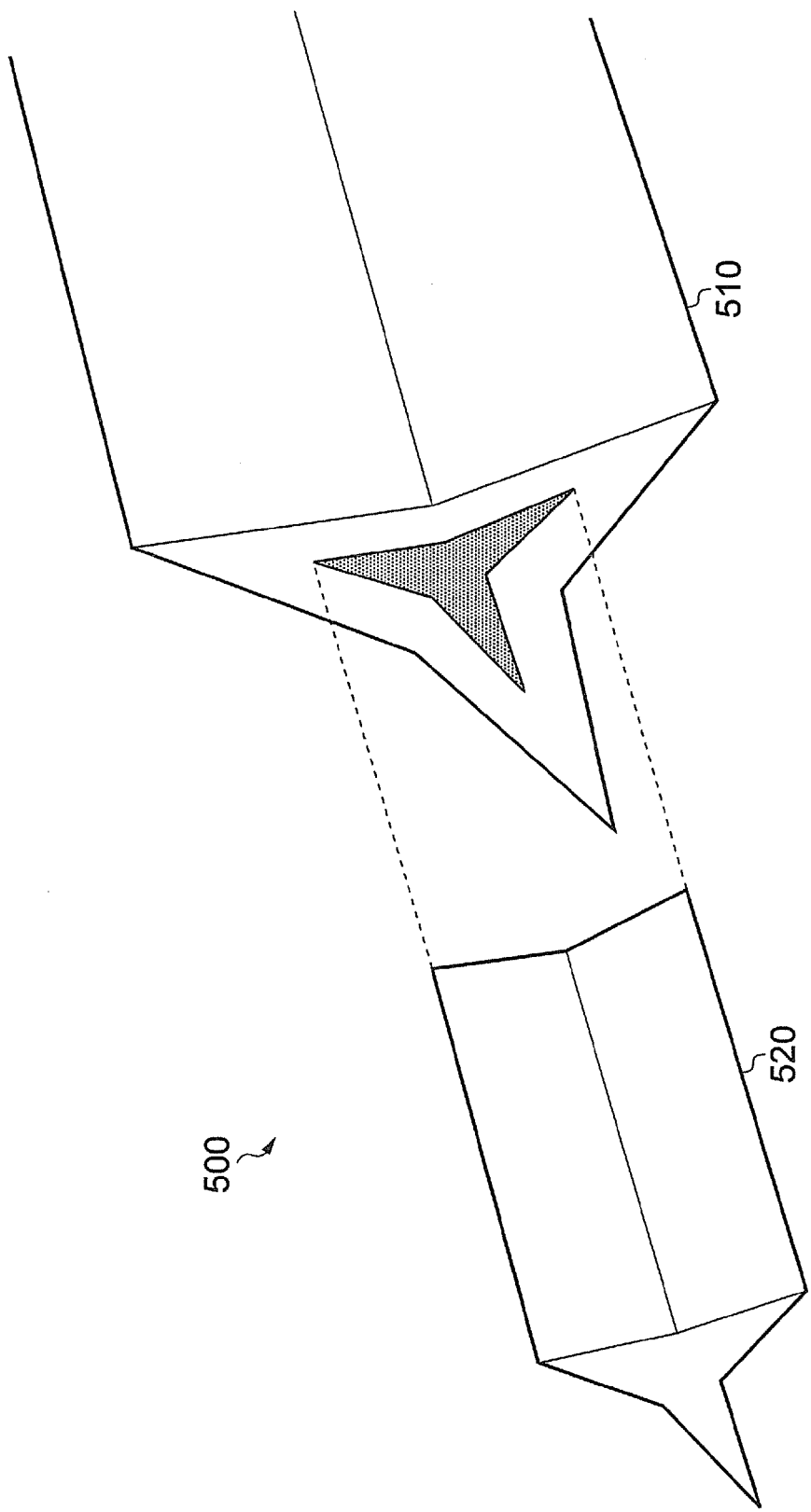
FIG. 8 illustrates a musical aid apparatus comprising one musical aid which fits inside another musical aid.

One may wish to represent more types of musical pattern than can be accommodated on the side surfaces 12 of a single musical aid 2. In this case, multiple musical aids can be produced each having different arrangements of markers on its side surfaces 12 to represent different groups of musical patterns. FIG. 8 illustrates an example embodiment of a musical aid apparatus 500 which comprises a first musical aid 510 and a second musical aid 520. The first musical aid 510 has a hollow elongate body with an internal cross-section of the same shape as the cross-section of the second musical 520. The second musical aid 520 is shaped to fit inside the hollow first musical aid 510. Therefore, the second musical aid 520 can be stored inside the first musical aid 510 when not in use. This enables the musical aid apparatus 500 to be stored or transported in a compact form. Alternatively, three or more musical aids can be arranged inside one another. Although the musical aid apparatus 500 has been illustrated with the first and second musical aids 510, 520 having a cross-section in the form of a three-pointed star, clearly other cross-sections can also be used for the musical aid apparatus 500.

Figure 9:
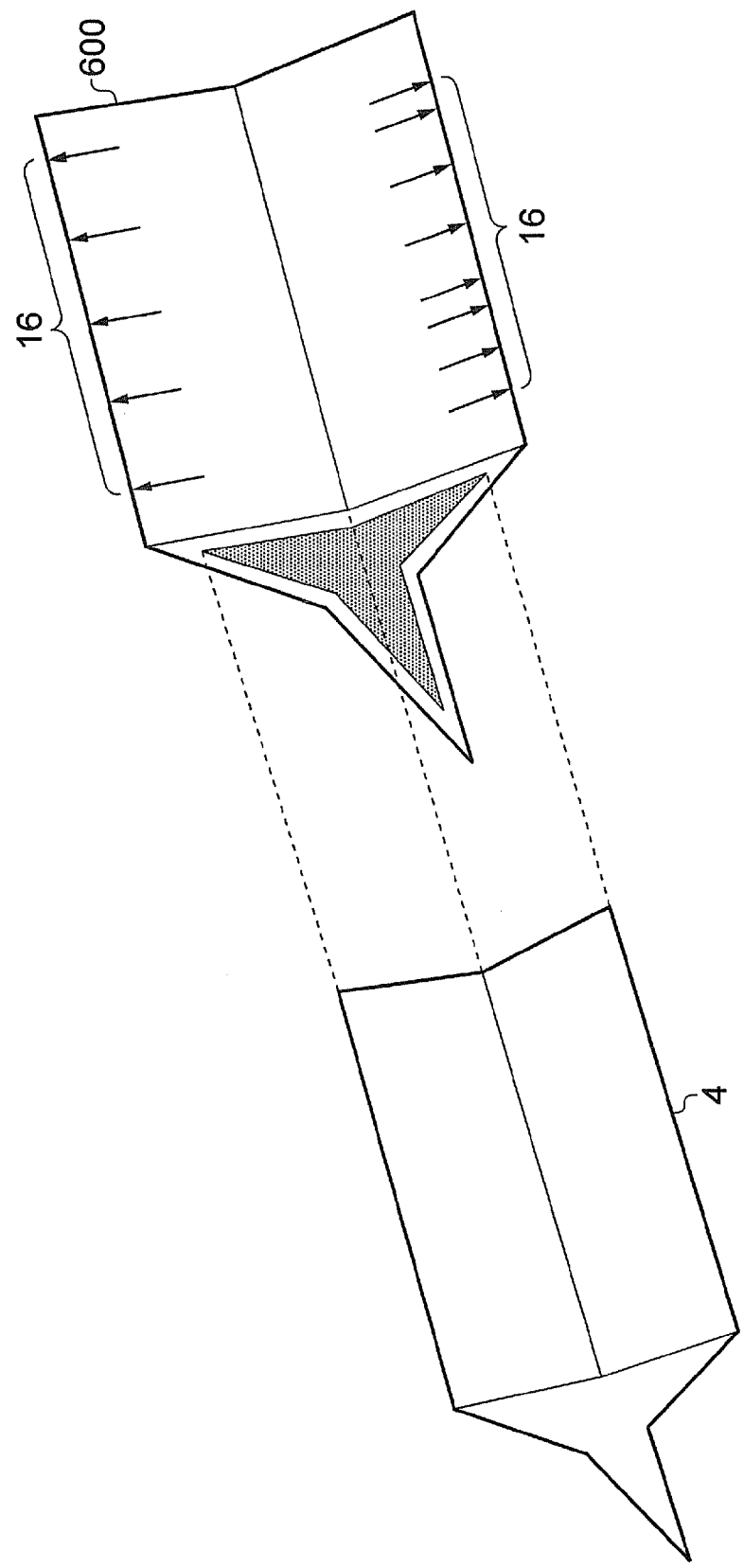
FIG. 9 illustrates a musical aid in which the elongate body has an outer sleeve for carrying the key-indicating markers.

Another technique for representing many musical pattern types with a single musical aid shown in FIG. 9. The elongate body 4 may have an outer sleeve 600 which is shaped to fit over the elongate body 4. The outer sleeve 600 of the elongate body carries the sets of key-indicating markers 16 so that when the sleeve 600 is placed over the elongate body 4, the musical aid functions as in the previous embodiments. The sleeve 600 can be removed from the elongate body 4 and replaced with another sleeve carrying different sets of key-indicating markers 16. The sleeve 600 can be made of a rigid or flexible material. Two or more sleeves 600 can be provided for fitting onto a single elongate body 4 in order to change the combination of musical patterns which is represented by the musical aid. Sleeves 600 may be provided separately from the elongate body of the musical aid. If the elongate body is hollow, the sleeves may be conveniently be stored within the elongate body when not in use.

An electronic version of the musical aid can also be produced. For example, the key-indicating markers of the first, second and third types could be represented in an electronic form by lights or LEDs of different colours provided on the surface of the elongate body 4 (the elongate body still being shaped as explained above). By angling the lights downwards towards the keys when the musical aid is in use, the lights can illuminate the keys, causing at least the white keys to appear to be coloured when indicated by one of the marker lights (whether the black keys appear coloured will depend on how reflective the black keys are). Colouring the keys in this way enhances the ease of use of the musical aid, since it is easy to understand which notes are to be played.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

APPENDIX

Various example sets of key-indicating markers are listed below. A single musical aid 2 can carry on its various side surfaces 12 any combination of these sets of key-indicating markers, as well as other sets of key-indicating markers. For each set of key-indicating markers, a table lists the marker type (first, second or third, corresponding to the types explained above), the interval represented by the marker (relative to the root key-indicating marker), and the number of semitones separating the marker from the root-key indicating marker. For sets of markers indicating chord types, the playable types of chords are also listed.

Major Chord

| Marker Type | Marker Interval | Semitones from root |
| --- | --- | --- |
| 1 | Root | 0 |
| 1 | Major Third | 4 |
| 2 | Diminished Fifth (b5) | 6 |
| 1 | Perfect Fifth | 7 |
| 2 | Augmented Fifth (#5) | 8 |
| 3 | Major Sixth (6) | 9 |
| 3 | Minor Seventh (7) | 10 |
| 3 | Major Seventh (M7) | 11 |
| 1 | Octave | 12 |
| 3 | Ninth (9) | 14 |

Playable chord types include at least the major, major (6), major (7), major (M7), major (9), major (6 7), major (6 M7), major (6 9), major (7 9), major (M7 9), major (6 7 9), major (6 M7 9), major (b5), major (b5 6), major (b5 7), major (b5 M7), major (b5 9), major (b5 6 7), major (b5 6 M7), major (b5 6 9), major (b5 7 9), major (b5 M7 9), major (b5 6 7 9), major (b5 6 M7 9), major (#5), major (#5 6), major (#5 7), major (#5 M7), major (#5 9), major (#5 6 7), major (#5 6 M7), major (#5 6 9), major (#5 7 9), major (#5 M7 9), major (#5 6 7 9), and major (#5 6 M7 9) chords.

Minor Chord

| Marker Type | Marker Interval | Semitones from root |
| --- | --- | --- |
| 1 | Root | 0 |
| 1 | Minor Third | 3 |
| 2 | Diminished Fifth (b5) | 6 |
| 1 | Perfect Fifth | 7 |
| 2 | Augmented Fifth (#5) | 8 |
| 3 | Minor Seventh (7) | 10 |
| 3 | Major Seventh (M7) | 11 |
| 1 | Octave | 12 |
| 3 | Ninth (9) | 14 |

Playable chord types include at least the minor, minor (7), minor (M7), minor (9), minor (7 9), minor (M7 9), minor (b5), minor (b5 7), minor (b5 M7), minor (b5 9), minor (b5 7 9), minor (b5 M7 9), minor (#5), minor (#5 7), minor (#5 M7), minor (#5 9), minor (#5 7 9), and minor (#5 M7 9) chords. If desired, a third type of marker corresponding to a major sixth (nine semitones above the root) could be added which would double the number of chord types playable using this set.

Suspended Chord

| Marker Type | Marker Interval | Semitones from root |
| --- | --- | --- |
| 1 | Root | 0 |
| 3 | Second | 2 |
| 3 | Perfect Fourth | 5 |
| 1 | Perfect Fifth | 7 |
| 3 | Minor Seventh (7) | 10 |
| 1 | Octave | 12 |

Playable chord types include at least the perfect fifth (power chord), suspended second, suspended fourth, suspended second seventh and suspended fourth seventh chords.

Dominant Seventh Chord

| Marker Type | Marker Interval | Semitones from root |
|---|---|---|
| 1 | Root | 0 |
| 1 | Major Third | 4 |
| 1 | Perfect Fifth | 7 |
| 1 | Minor Seventh (7) | 10 |
| 3 | Diminished Ninth (b9) | 13 |
| 3 | Ninth (9) | 14 |
| 3 | Augmented Ninth (#9) | 15 |

Playable chord types include at least the dominant seventh, dominant seventh (b9), dominant seventh (9), and dominant seventh (#9) chords.

Augmented Chord

| Marker Type | Marker Interval | Semitones from root |
|---|---|---|
| 1 | Root | 0 |
| 1 | Major Third | 4 |
| 1 | Augmented Fifth | 8 |
| 3 | Major Seventh (7) | 11 |

Playable chord types include at least the major augmented fifth and major augmented fifth major seventh chords.

Diminished Chord

| Marker Type | Marker Interval | Semitones from root |
|---|---|---|
| 1 | Root | 0 |
| 1 | Minor Third | 3 |
| 1 | Diminished Fifth | 6 |
| 3 | Diminished Seventh (=Major Sixth) | 9 |
| 1 | Octave | 12 |

Playable chord types include at least the diminished chord and the diminished seventh chord.
For each of the chord types listed above, a corresponding arpeggio can also be played.

Major (Ionian) Scale

| Marker Type | Marker Interval | Semitones from root |
|---|---|---|
| 1 | Root | 0 |
| 1 | Second | 2 |
| 1 | Major Third | 4 |
| 1 | Perfect Fourth | 5 |
| 1 | Perfect Fifth | 7 |
| 1 | Major Sixth | 9 |
| 1 | Major Seventh | 11 |
| 1 | Octave | 12 |

Melodic Minor Scale

| Marker Type | Marker Interval | Semitones from root |
|---|---|---|
| 1 | Root | 0 |
| 1 | Second | 2 |
| 1 | Minor Third | 3 |
| 1 | Perfect Fourth | 5 |
| 1 | Perfect Fifth | 7 |
| 1 | Minor Sixth (DOWN) | 8 |
| 1 | Major Sixth (UP) | 9 |
| 1 | Minor Seventh (DOWN) | 10 |
| 1 | Major Seventh (UP) | 11 |
| 1 | Octave | 12 |

In the melodic minor scale, the keys indicated by the markers marked UP are played when the scale is ascending from the root note to the octave note, and the keys indicated by the markers marked DOWN are played when the scale is descending from the octave note to the root note.

Harmonic Minor Scale

| Marker Type | Marker Interval | Semitones from root |
|---|---|---|
| 1 | Root | 0 |
| 1 | Second | 2 |
| 1 | Minor Third | 3 |
| 1 | Perfect Fourth | 5 |
| 1 | Perfect Fifth | 7 |
| 1 | Minor Sixth | 8 |
| 1 | Major Seventh | 11 |
| 1 | Octave | 12 |

Whole Tone Scale

| Marker Type | Marker Interval | Semitones from root |
|---|---|---|
| 1 | Root | 0 |
| 1 | Second | 2 |
| 1 | Major Third | 4 |
| 1 | Diminished Fifth | 6 |
| 1 | Minor Sixth | 8 |
| 1 | Minor Seventh | 10 |
| 1 | Octave | 12 |

Dominant Seventh Arpeggio

| Marker Type | Marker Interval | Semitones from root |
|---|---|---|
| 1 | Root | 0 |
| 1 | Major Third | 4 |
| 1 | Perfect Fifth | 7 |
| 1 | Minor Seventh | 10 |
| 1 | Octave | 12 |

Diminished Seventh Arpeggio

| Marker Type | Marker Interval | Semitones from root |
|---|---|---|
| 1 | Root | 0 |
| 1 | Minor Third | 3 |
| 1 | Diminished Fifth | 6 |
| 1 | Diminished Seventh (=Major Sixth) | 9 |
| 1 | Octave | 12 |

Dorian Scale

| Marker Type | Marker Interval | Semitones from root |
|---|---|---|
| 1 | Root | 0 |
| 1 | Second | 2 |
| 1 | Minor Third | 3 |
| 1 | Perfect Fourth | 5 |
| 1 | Perfect Fifth | 7 |
| 1 | Major Sixth | 9 |
| 1 | Minor Seventh | 10 |
| 1 | Octave | 12 |

Phrygian Scale

| Marker Type | Marker Interval | Semitones from root |
|---|---|---|
| 1 | Root | 0 |
| 1 | Minor Second | 1 |
| 1 | Major Third | 3 |
| 1 | Perfect Fourth | 5 |
| 1 | Perfect Fifth | 7 |
| 1 | Minor Sixth | 8 |
| 1 | Minor Seventh | 10 |
| 1 | Octave | 12 |

Lydian Scale

| Marker Type | Marker Interval | Semitones from root |
|---|---|---|
| 1 | Root | 0 |
| 1 | Second | 2 |
| 1 | Major Third | 4 |
| 1 | Augmented Fourth (=Diminished Fifth) | 6 |
| 1 | Perfect Fifth | 7 |
| 1 | Major Sixth | 9 |
| 1 | Major Seventh | 11 |
| 1 | Octave | 12 |

Mixolydian Scale

| Marker Type | Marker Interval | Semitones from root |
|---|---|---|
| 1 | Root | 0 |
| 1 | Second | 2 |
| 1 | Major Third | 4 |
| 1 | Perfect Fourth | 5 |
| 1 | Perfect Fifth | 7 |
| 1 | Major Sixth | 9 |
| 1 | Minor Seventh | 10 |
| 1 | Octave | 12 |

Aeolian (Natural Minor) Scale

| Marker Type | Marker Interval | Semitones from root |
|---|---|---|
| 1 | Root | 0 |
| 1 | Second | 2 |
| 1 | Minor Third | 3 |
| 1 | Perfect Fourth | 5 |
| 1 | Perfect Fifth | 7 |
| 1 | Minor Sixth | 8 |
| 1 | Minor Seventh | 10 |
| 1 | Octave | 12 |

Locrian Scale

| Marker Type | Marker Interval | Semitones from root |
|---|---|---|
| 1 | Root | 0 |
| 1 | Minor Second | 1 |
| 1 | Minor Third | 3 |
| 1 | Perfect Fourth | 5 |
| 1 | Diminished Fifth | 6 |
| 1 | Minor Sixth | 8 |
| 1 | Minor Seventh | 10 |
| 1 | Octave | 12 |

The Dorian, Phrygian, Lydian, Mixolydian, Aeolian and Locrian scales are called modal scales. Each modal scale is equivalent to a section of a major scale. Whereas the major scale starts at the root note of the major scale, each corresponding modal scale starts at a different note other than the root note of the major scale. For example, the notes of the C major scale are: C, D, E, F, G, A, B and C. If one starts from D and continue upwards to a D an octave higher, then the notes D, E, F, G, A, B, C and D form the notes of a Dorian scale having D as its root note. Therefore, the D Dorian scale can be regarded as a "mode" of the C major scale. Similarly, the E Phrygian, F Lydian, G Mixolydian, A Aeolian, and B Locrian scales correspond to sections of the C major scale starting on the notes E, F, G, A and B respectively.

For this reason, instead of providing the separate sets of key-indicating markers for the modal scales as shown above, the modal scales could also be played using the set of key-indicating markers indicating the major scale (although the set of key-indicating markers for the major scale would need to cover two octaves instead of one octave as indicated above). The Dorian, Phrygian, Lydian, Mixolydian, Aeolian and Locrian scales could then be played by starting at the second, third, fourth, fifth, sixth and seventh notes of the major scale respectively and finishing an octave above the start note.

Further sets of markers can be provided to indicate jazz scales or jazz chords if desired.

Musical aids having a three-ridged elongate body have six side surfaces, enabling up to six sets of key-indicating markers 16 to be carried on the side surfaces. For example, a chord musical aid could carry the sets of key-indicating markers corresponding to the major chord, minor chord, suspended chord, dominant seventh chord, augmented chord and diminished chord. A scale musical aid could carry the sets of key-indicating markers corresponding to the major scale, melodic minor scale, harmonic minor scale, whole tone scale, dominant seventh arpeggio and diminished seventh arpeggio. A modal musical aid could carry the sets of key-indicating markers corresponding to the Dorian scale, Phrygian scale, Lydian scale, Mixolydian scale, Aeolian scale and Locrian scale.

If desired, instructions can be provided with the musical aid indicating a recommended fingering for playing the musical patterns (scales in particular).

The invention claimed is:

1. A musical aid for use with a musical keyboard, comprising:
an elongate body having at least three ridges extending outwardly from and longitudinally along the musical aid, each ridge having two side surfaces, at least two different side surfaces of the at least three ridges carrying respective sets of key-indicating markers, each set of key-indicating markers representing a different group of one or more types of musical pattern; wherein
adjacent ridges of the at least three ridges are shaped to form a concave surface between the adjacent ridges, the concave surface extending longitudinally along the musical aid; and
the key-indicating markers of each set are spaced such that when the musical aid is located on the keyboard in an orientation in which a selected side surface is at a position at which a root key-indicating marker of the set carried by the selected side surface is positioned above any key of the keyboard, the key beneath the root key-indicating marker forms the root note of a group of one or more musical patterns of the types represented by the set carried by the selected side surface, and the remaining key-indicating markers of the set carried by the selected side surface are positioned above keys of the keyboard that correspond to the remaining notes of the group of musical patterns.

2. A musical aid according to claim 1, wherein the at least three ridges are evenly distributed about the longitudinal axis of the musical aid.

3. A musical aid according to claim 1, wherein the at least three ridges are shaped such that when the musical aid is located on the keyboard in said orientation, one of the ridges not having the selected side surface engages with a groove running behind the keys of the keyboard.

4. A musical aid according to claim 1, wherein the at least three ridges are shaped such that, when the musical aid is located on the keyboard in said orientation, an angle formed between the selected side surface and an upper surface of the keys of the keyboard is an obtuse angle.

5. A musical aid according to claim 1, wherein the elongate body has three ridges.

6. A musical aid according to claim 1, wherein the elongate body has four ridges.

7. A musical aid according to claim 1, wherein the maximum spacing between any two key-indicating markers in the same set corresponds to an interval of the keyboard that is not greater than two octaves.

8. A musical aid according to claim 7, wherein the maximum spacing between any two key-indicating markers in the same set corresponds to an interval of the keyboard that is not greater than an augmented ninth.

9. A musical aid according to claim 1, wherein the respective groups of one or more types of musical pattern comprise one or more of:
at least one group of one or more types of scale;
at least one group of one or more types of arpeggio; and
at least one group of one or more types of chord.

10. A musical aid according to claim 1, wherein at least one side surface carries a set of key-indicating markers representing a group of a plurality of different types of chord.

11. A musical aid according to claim 10, wherein the set of key-indicating markers of the at least one side surface comprises a plurality of first key-indicating markers representing a first chord type, and one or both of:
(a) at least one second key-indicating marker which, in combination with the plurality of first key-indicating markers other than a predetermined first key-indicating marker, represents a second chord type; and
(b) at least one third key-indicating marker which, in combination with all of the keys indicated by the first key-indicating markers, represents a third chord type.

12. A musical aid according to claim 11, wherein the plurality of first key-indicating markers are visually distinguishable from the one or both of the at least one second key-indicating marker and the at least one third key-indicating marker.

13. A musical aid according to claim 1, wherein the key-indicating markers of a set are arranged in a single row on the corresponding side surface.

14. A musical aid according to claim 1, wherein the root key-indicating marker of a set is the left-most key-indicating marker of the set.

15. A musical aid according to claim 1, wherein the elongate body has a sleeve shaped to fit over the elongate body, the sleeve being removable from the elongate body, and
the sets of key-indicating markers are carried on the outside of the sleeve.

16. A sleeve for a musical aid comprising an elongate body having at least three ridges extending outwardly from and longitudinally along the musical aid, each ridge having two side surfaces, adjacent ridges of the at least three ridges being shaped to form a concave surface between the adjacent ridges, the concave surface extending longitudinally along the musical aid; wherein:
the sleeve is shaped to fit over the elongate body of the musical aid;
the sleeve carries at least two sets of key indicating markers, each set of key-indicating markers being positioned such that when the sleeve is placed over the elongate body, the at least two sets of key indicating markers are carried on at least two different side surfaces of the at least three ridges, each set of key-indicating markers representing a different group of one or more types of musical pattern; and
the key-indicating markers of each set are spaced such that when the musical aid, with the sleeve fitted on the elongate body, is located on the keyboard in an orientation in which a selected side surface is at a position at which a root key-indicating marker of the set carried by the selected side surface is positioned above any key of the keyboard, the key beneath the root key-indicating marker forms the root note of a group of one or more musical patterns of the types represented by the set carried by the selected side surface, and the remaining key-indicating markers of the set carried by the selected side surface are positioned above keys of the keyboard that correspond to the remaining notes of the group of musical patterns.

17. A musical aid apparatus comprising:
a first musical aid according to claim 1; and
a second musical aid according to claim 1; wherein:
the elongate body of the first musical aid is hollow; and
the second musical aid is shaped to fit inside the hollow elongate body of the first musical aid.

18. A system comprising a musical keyboard and a musical aid according to claim 1.

19. A system comprising a musical keyboard and a musical aid apparatus according to claim 17.

20. A method of playing a desired musical pattern on a musical keyboard using a musical aid comprising an elongate body having at least three ridges extending outwardly from and longitudinally along the musical aid, each ridge having two side surfaces, adjacent ridges of the at least three ridges being shaped to form a concave surface between the adjacent ridges, the concave surface extending longitudinally along the musical aid, at least two different side surfaces of the at least three ridges carrying respective sets of key-indicating markers, each set of key-indicating markers representing a different group of one or more types of musical pattern;

the method comprising the steps of:

selecting a side surface of the musical aid that carries a set of key-indicating markers representing a group of one or more types of musical pattern that includes a type corresponding to the desired musical pattern;

locating the musical aid on the keyboard in an orientation in which the key-indicating markers of the selected side surface are adjacent to the keys of the keyboard;

positioning the musical aid such that a root key-indicating marker of the set carried by the selected side surface is positioned above a key of the keyboard that corresponds to a root note of the desired musical pattern; and playing the desired musical pattern by playing the key positioned below the root key-indicating marker and at least one key positioned below at least one of the remaining key-indicating markers of the set carried by the selected side surface.

* * * * *